United States Patent [19]

Kim

[11] Patent Number: 5,678,661
[45] Date of Patent: Oct. 21, 1997

[54] BRAKE LINING ABRASION DETECTION DEVICE

[75] Inventor: Jin-Hwan Kim, Anyang, Rep. of Korea

[73] Assignee: Kia Motors Corporation, Seoul, Rep. of Korea

[21] Appl. No.: 594,210

[22] Filed: Jan. 31, 1996

[30] Foreign Application Priority Data

Apr. 7, 1995 [KR] Rep. of Korea ............... 95-8079

[51] Int. Cl.$^6$ ............................................. F16D 66/02
[52] U.S. Cl. ............................................. 188/1.11
[58] Field of Search ........................... 188/1.11 WE, 188/1.11 R, 1.11 E, 1.11 W

[56] References Cited

U.S. PATENT DOCUMENTS

| 2,814,684 | 11/1957 | De Pascale | 188/1.11 WE |
| 3,479,640 | 11/1969 | Puma | 188/1.11 WE |
| 4,188,613 | 2/1980 | Yang et al. | 188/1.11 WE |
| 4,274,511 | 6/1981 | Moriya | 188/1.11 WE |
| 4,508,196 | 4/1985 | Jamon | 188/1.11 WE |
| 4,606,434 | 8/1986 | Vasilow et al. | 188/1.11 WE |

FOREIGN PATENT DOCUMENTS 0159439  9/1984  Japan ............... 188/1.11 WE

Primary Examiner—Matthew C. Graham

[57] ABSTRACT

A brake abrasion detection device in a drum-type brake is disclosed. The device includes; a cylindrical housing made of insulating material having a hole at one end, and a female thread portion at the other end; a cap member where a male thread portion is formed at its circumference for connecting with the female thread portion and where a hole is formed at its center, a detector formed at the center portion of a flange held in the housing and contacting the recess formed in a brake lining through the hole of the housing; a spring made of a conductive material held by the housing and for applying pressure to the flange of the detector toward the brake lining; a connector installed opposite with respect to the flange of the detector and having a shaft externally extending from a flange for supporting the spring through the hole of the cap member; and a bracket for installing the housing a brake shoe, wherein a cable connected with an indication lamp is connected with the shaft, and depth of the recess formed at the brake lining is congruous with a braking efficiency limit line.

4 Claims, 3 Drawing Sheets

BRAKE LINING ABRASION DETECTION DEVICE

BACKGROUND OF THE INVENTION

The present invention relates to a brake lining abrasion detection device, and more particularly to a brake lining abrasion detection device for detecting a degree of abrasion of a brake lining in a drum-type brake and indicating change time of the brake lining.

In general, a braking system for automobiles is for decelerating the automobiles to a stop and concurrently maintaining a parking state. For that purpose, a friction-type brake is mainly employed, which converts kinetic energy to heat energy using a friction force between a brake shoe and brake lining of a wheel and emits heat into atomsphere.

There are two types used for the brake lining of automobiles: a woven type and a mold type. The woven type is made by weaving cloth out of asbestos fiber with a core line made of brass, lead and zinc and impregnating the resultant with a mineral fiber or plastics and then heat-molding the same. The mold type is made by molding short fiber asbestos with a mixture of materials such as plastics and rubber at a high temperature and pressure.

However, since the lining formed of asbestos during braking, blows off powder that is harmful to a human body, a lining of a non-asbestos origin is currently used.

In FIG. 1, a general drum-type brake for automobiles is schematically illustrated. The drum-type brake includes a cylindrical brake drum 21 at the circumference of which a wheel of the automobile is installed, a pair of brake shoes 23 installed inside the brake drum 21 by means of an anchor pin 25 which move back and forth according to the operation of a wheel cylinder 24, and a pair of brake linings 22 each provided between inner circumference of brake drum 21 and each brake shoe 23. The brake linings 22 are installed at the outer circumference of the brake shoes 23 by riveting, respectively.

During the braking process, each brake lining 22 closely contacts the inner surface of rotating the brake drum 21 through a forward movement of a wheel cylinder 24 which is connected with each brake shoe 23 and applies pressure to the brakes shoes 23. This action in turn, generates friction between the brake drum 21 and the brake linings 22, thus stopping the automobile.

Therefore, abrasion of the brake linings 22 occurs due to the friction caused with the brake drum 21. If the brake linings 22 are abraded past a particular minimum thickness, braking performance of the brake linings 22 is diminished and the brake linings 22 should be exchanged with new ones.

Accordingly, when the brake linings are used for a long time, it is important to recognize when to exchange them. If not, there is the danger of an accident from the diminished braking efficiency due to over abrasion of the brake lining.

To accurately determine when to exchange the brake linings, a solution has been proposed which is to install a sensor in the brake shoes gwr sensing a degree of abrasion of the brake linings, as shown in FIG. 2.

In the proposal shown in FIG. 2, a detection member 30 is fixedly inserted into a rivet insertion aperture 27 at a portion where abrasion of brake lining 22 occurs fastest, and the head of the detection member 30 is formed greater than head of rivet 28 which couples brake linings 22 and brake shoes by a distance "d". Thus, the end of the detection member 30 is closer to a brake drum 21 than rivet 28. The detection member 30 is connected to a lamp 62 and a power source 61, and the brake drum 21 is grounded to the body.

Here, the end of detection member 30 is positioned at the same line as a braking efficiency limit line "a" according to the abrasion of brake lining 22. The braking efficiency limit line "a" refers to a line where braking efficiency begins to diminish due to the abrasion of brake lining 22 goes past a particular distance b.

The detection member 30 is connected with the (+) pole of power source 61, and the brake drum 21 is grounded to the body. Thus, when the detection member 30 contacts the inner surface of the brake drum 21, a warning lamp, connected to both the detection member 30 and the body, is turned on and whereby, a driver is informed of the time to exchange the brake linings.

In the conventional brake lining abrasion detection device, however, because the end portion of the detection member 30 is itself abraded by contact with the brake drum 21, the detection member 30 must be exchanged along with the lining.

Also, it is impossible to precisely provide an exchange time of the brake linings when the brake lining abrasion detection device is not accurately installed. In addition, the detection device may inaccurately perform due to shocks and vibrations that occur during the driving of the automobile.

SUMMARY OF THE INVENTION

To solve the above problems, it is an object of the present invention to provide a brake lining detection device for automobiles which has a long life, is more accurate and is simply installed so that faulty operation, due to shock and vibration that occur during the driving of the automobile, can be prevented.

Accordingly, to achieve the above object, there is provided a brake lining abrasion detection device in a drum-type brake comprising: a body of a cylindrical shape which is made of an insulating material and having an engaging groove on the circumference thereof; a detection portion formed as an electrically conductive pin passed through the body and one end thereof contacting the bottom portion of a recess formed in a brake lining through a hole formed in a brake shoe and the other end associated with a cable connected to an indication lamp; and a leaf spring bracket installed at the brake shoe and for supporting the body by being connected to the engaging groove of the body and elastically keeping the detection portion in place by applying pressure toward the recess.

It is preferred in the present invention that a ball is installed at the tip of the detection portion contacting the bottom portion of the recess formed in the brake lining.

It is also preferred in the present invention that the hole formed in the brake shoe and the body are screw-coupled and a spring washer is installed between the brake shoe and the body.

To achieve the above object, there is provided a brake lining abrasion detection device in a drum-type brake comprising: a cylindrical housing formed of an insulating material having a hole formed at one end thereof and a thread screw portion formed at the other end thereof; a cap member where a male thread portion is formed at the circumference thereof for connecting with the female thread portion formed at the housing and a hole is formed at the center thereof; a detector formed at the center portion of a flange received in the housing and contacting the recess formed in a brake lining via the hole of the housing; a spring formed of a conductive material held by the housing and for applying pressure to the flange of the detector toward the brake lining; a connector installed opposite with respect to the flange of the detector and having an shaft externally extending from a flange for supporting the spring via the hole of the cap member; and a bracket for installing the housing at the brake shoe; and wherein a cable is connected with an indication lamp 28 and 29 is connected with the shaft, and depth of the recess formed at the brake lining is congruous with a braking efficiency limit line.

It is preferred in the present invention that the tip of the detection portion is coated with an insulating material.

BRIEF DESCRIPTION OF THE DRAWINGS

The above object and advantages of the present invention will become more apparent by describing in detail preferred embodiments thereof with reference to the attached drawings in which.

DETAILED DESCRIPTION OF THE INVENTION

Figure 1:
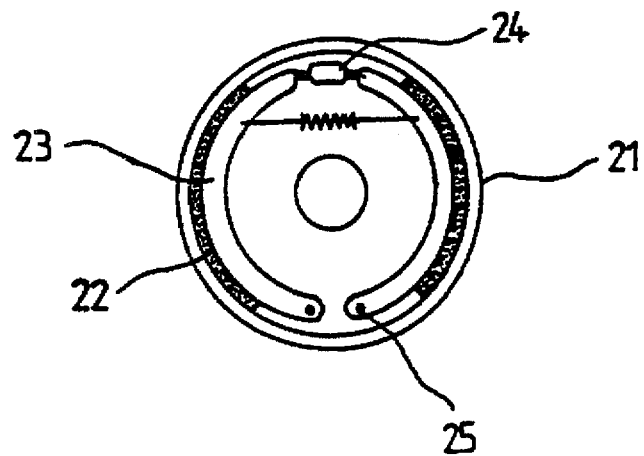
FIG. 1 is a front view illustrating a general drum-type brake.
Figure 2:
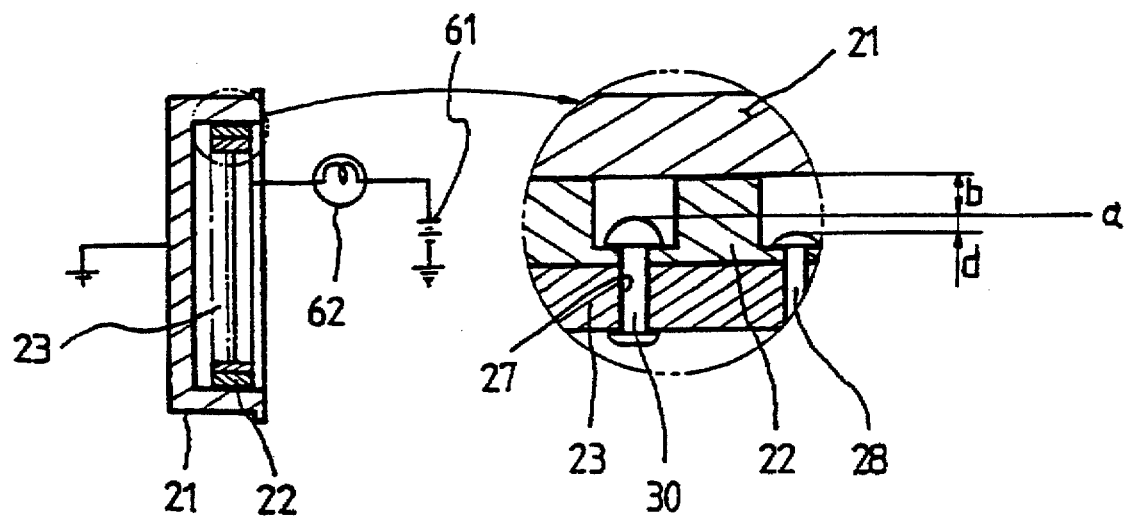
FIG. 2 is a schematic sectional view illustrating a brake lining abrasion detection device of a conventional drum-type brake.
Figure 3:
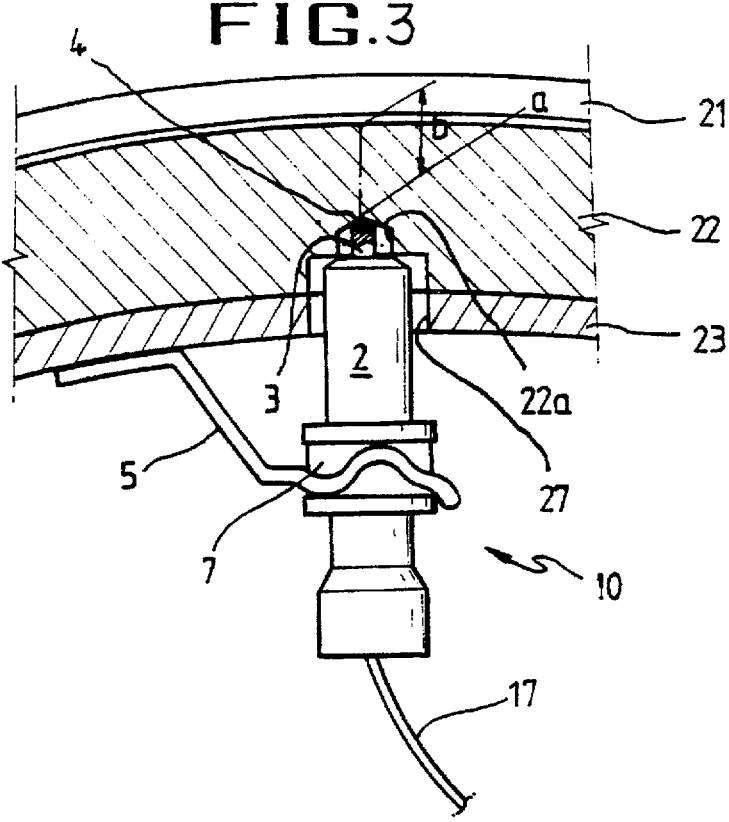
FIG. 3 is a view illustrating a state where a brake lining abrasion detection device, according to a first embodiment of the present invention, is installed.

In FIG. 3, a brake lining detection device is illustrated according to a first embodiment of the present invention. In FIG. 3, a brake lining 22 is installed by riveting to a brake shoe 23, via a plurality of rivet insertion holes 27 formed on the brake shoe 23. A recess 22a is formed in the brake lining 22 to match one of rivet insertion holes 27 formed on the brake shoe 23. The recess 22a is formed to the depth defined by a braking efficiency limit line "a". When the brake lining 22 is abraded as much as thickness "b", an indication lamp 28 and 29 (not shown) turns on which indicates a exchange time for the brake lining 22.

To indicate the exchange time for an abraded brake lining, a brake lining abrasion detection device 10 of the present invention is installed at the inner portion of brake shoe 23 by means of a leaf spring bracket 5. The leaf spring bracket 5 is fixed to the brake shoe 23 by a rivet (not shown) for attaching the brake 23 to the brake lining 22, and is engaged with a groove 7 formed at a body 2 of cylindrical shape so as to elastically support the body 2. As shown in FIG. 3, the leaf spring bracket 5 engaged with the groove 7, elastically keeps the body 2 in place by applying pressure toward the recess 22 and absorbs any shock and vibration transferred to the body 2.

The tip of the body 2 is placed to pass through the rivet insertion aperture 27 formed at the brake shoe 23. A detection portion 3, an electrically conductive pin, is installed in body 2. The tip of detection portion 3 contacts the bottom portion of the recess 22a formed in the brake lining 22, and the opposite end of the detection portion 3 is connected to a cable 17 that is connected to the indication lamp 28 and 29. In addition, the detection portion 3 has a ball-shaped head protruding from the tip of body 2 to thereby contact the recess 22a.

The cable 17, connected to the opposite end of the detection portion 3, is connected to the (+) pole of a power source 28 and 29 via the indication lamp. Accordingly, the indication lamp is turned on when the detection portion 3 contacts the brake drum 21 that is grounded to the (−) pole of the power source 28 and 29 .

A ball 4 can be previously installed at the tip of detection portion 3 contacting brake drum 21 in such a manner so as to allow rotating movement of the ball 4. Thus, the abrasion of the detection portion 3 can be prevented since the ball 4 of the detection portion 3 rotates according to the rotation of the brake drum 21.

If the brake lining 22 is made of a material having electrical conductivity, detection portion 3 or groove 22a can be coated with an insulating material for insulation.

Figure 4:
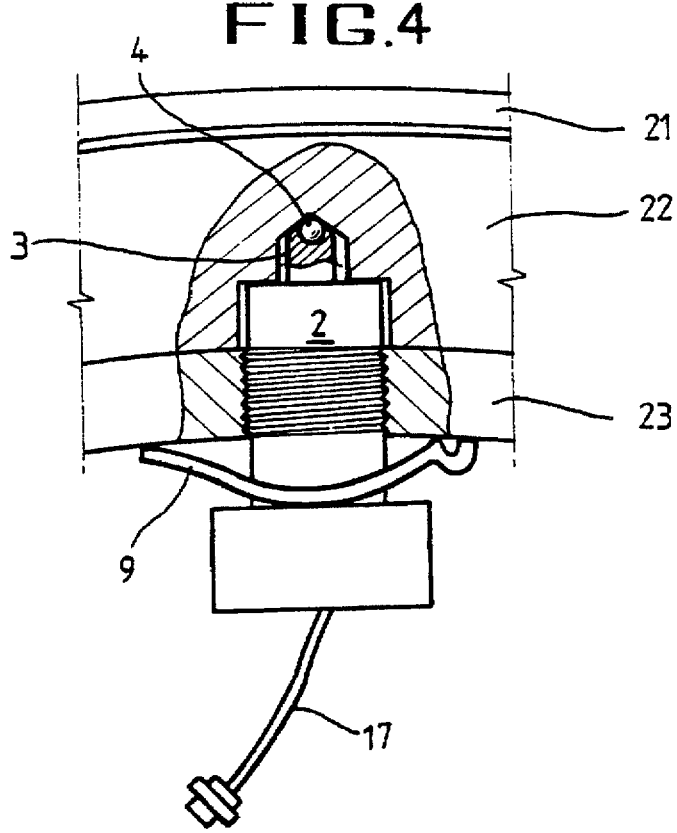
FIG. 4 is a view illustrating a state where a brake lining abrasion detection device, according to a second embodiment of the present invention, is installed.

FIG. 4 shows a state where a brake lining detection device according to a second embodiment of the present invention. In the second embodiment, the hole formed in the brake shoe 23 is tapped and a male thread portion is formed on the circumference of the body 2 to be coupled with a female thread portion formed at the brake shoe 23. To prevent release of screw coupling, a spring washer 9 is installed between the brake shoe 23 and the body 2. Since the other portion of this embodiment is the same as those of the first embodiment, description of the same portions will be omitted.

Figure 5:
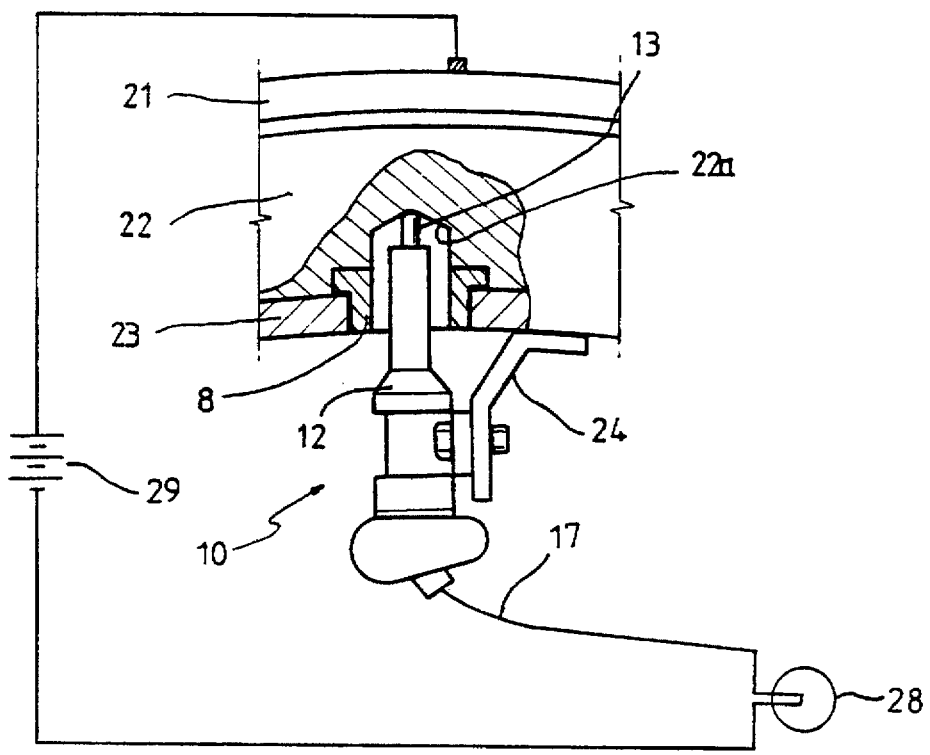
FIG. 5 is a view schematically illustrating a state where a brake lining abrasion detection device, according to a third embodiment of the present invention, is installed.

FIG. 5 schematically shows a brake lining abrasion detection device in accordance to a third embodiment of the present invention. As seen from FIG. 5, a brake lining abrasion detection device 10 of the present invention is installed inside the brake shoe 23 by means of a bracket 24. The bracket 24 is attached to the brake shoe 24 by a rivet for attaching the brake lining 22 to the brake shoe 23. At the tip of brake lining abrasion detection device 10, there is a detection portion 13 having a ball head that protrudes and contacts the recess 22a formed in the brake lining 22. A guide 8 for guiding detection portion 13 is installed between the brake shoe 23 and the brake lining 22, and detection portion 13 is for detecting the amount of abrasion of brake lining 21.

Figure 6:
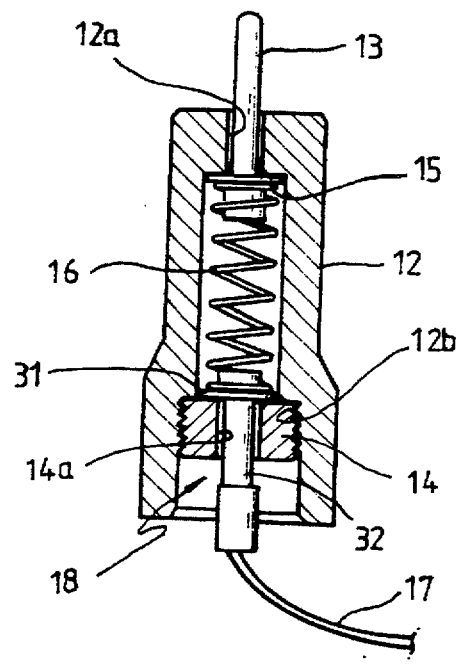
FIG. 6 is a vertical section illustrating an inside structure of the brake lining abrasion detection device shown in FIG. 5.

In FIG. 6, the inside structure of the brake lining abrasion detection device 10 is illustrated. Brake lining abrasion detection device 10 comprises a cylindrical housing 12, a cap member 14, a detector 13, a spring 16 and a connector 18. The cylindrical housing 12 is formed of an insulating material having a hole 12a formed at one end thereof and a female thread portion 12b formed at the other end thereof. In the cap member 14, a female thread portion is formed at the circumference thereof to be engaged with the male thread portion 12b formed at the housing 12 and a hole 14a is formed at the center of the cap member 14. The detector 13 is formed at the center portion of a flange 15 received in the housing 12 and contacts the recess 22a formed in the brake lining 22 through the hole 12a of the housing 12. The tip of the detector 13 has a sphere for facilitating the contact of recess 22a. The spring 16 of a conductive material is held by the housing 12 and applies pressure to the flange 15 of detector 13 towards the brake lining 22. The connector 18 is installed oppositely with respect to the flange 15 and having an shaft 32 externally extending from a flange 31 for supporting the spring 16 via the hole 14a of the cap member 14. The cable 17, connected with the indication lamp 28 and 29, is connected to the shaft 32 of the connector 18.

In FIGS. 5 and 6, the end tip of the detector 13 always contacts the bottom surface of the groove 22a formed in the brake lining 2 by means of the spring 16. As in the above embodiment, when the brake lining 22 is formed of an electrically conductive material, the recess 22a or the end tip of the detector 13 is coated with an insulating material to thereby prevent the indication lamp 28 and 29 from turning on.

As described above, in the brake lining abrasion detection device according to the present invention, though the brake lining is abraded to the braking efficiency limit lining such that the tip of the detection portion contacts the brake drum, the abrasion amount of the detection portion becomes small, and by changing the lining, the brake lining abrasion detection device can be reinstalled to a new brake lining.

Also, since the present brake lining abrasion detection device can be accurately installed at the brake shoe, the exchange time of the brake lining can be accurately provided. Furthermore, the shock and vibration occurring during driving of the automobile can be elastically absorbed and thus a faulty operation therefrom can be prevented.

What is claimed is:

1. A brake lining abrasion detection device in a drum-type brake comprising:

a cylindrical housing formed of an insulating material having a hole formed at one end thereof and a female thread portion formed at the other end thereof;

a cap member where a male thread portion is formed at the circumference thereof for connecting with the female thread portion formed at the housing and a hole is formed at the center thereof;

a detector formed at the center portion of a flange held in the housing and contacting the recess formed in a brake lining via the hole of the housing;

a spring made of a conductive material held by the housing and for applying pressure to the flange of the detector toward the brake lining;

a connector installed opposite with respect to the flange of the detector and having shaft externally extending from a flange for supporting the spring via the hole of the cap member; and a bracket for installing the housing at brake shoe; wherein a cable connected with an indication lamp is connected with the shaft, and depth of the recess formed at the brake lining is congruous with a braking efficiency limit line.

2. A brake lining abrasion detection device of claim 1, wherein a ball is installed at the tip of the detection portion contacting the bottom portion of the recess formed in the brake lining.

3. A brake lining abrasion detection device of claim 1, wherein the tip of the detection portion is coated with an insulating material.

4. A brake lining abrasion detection device of claim 1, wherein the recess formed in the brake lining is coated with an insulating material.

* * * * *